(12) United States Patent
Xu

(10) Patent No.: US 12,488,608 B2
(45) Date of Patent: Dec. 2, 2025

(54) SEQUENCE RECOGNITION METHOD AND APPARATUS, IMAGE PROCESSING DEVICE, AND STORAGE MEDIUM

(71) Applicant: HANGZHOU HIKVISION DIGITAL TECHNOLOGY CO., LTD., Zhejiang (CN)

(72) Inventor: Yunlu Xu, Shanghai (CN)

(73) Assignee: HANGZHOU HIKVISION DIGITAL TECHNOLOGY CO., LTD., Zhejiang (CN)

(*) Notice: Subject to any disclaimer, the term of this patent is extended or adjusted under 35 U.S.C. 154(b) by 326 days.

(21) Appl. No.: 18/017,660

(22) PCT Filed: Jul. 30, 2021

(86) PCT No.: PCT/CN2021/109764
§ 371 (c)(1),
(2) Date: Jan. 23, 2023

(87) PCT Pub. No.: WO2022/022704
PCT Pub. Date: Feb. 3, 2022

(65) Prior Publication Data
US 2023/0274566 A1    Aug. 31, 2023

(30) Foreign Application Priority Data
Jul. 30, 2020    (CN) .......................... 202010751330.X

(51) Int. Cl.
*G06V 30/00*    (2022.01)
*G06V 30/18*    (2022.01)
(52) U.S. Cl.
CPC .................................. *G06V 30/18* (2022.01)

(58) Field of Classification Search
CPC ...... G06V 30/18; G06V 10/22; G06V 10/454; G06V 10/82; G06V 20/625; G06V 30/242;
(Continued)

(56) References Cited

U.S. PATENT DOCUMENTS

2021/0232847 A1* 7/2021 Yue ..................... G06F 18/2148

FOREIGN PATENT DOCUMENTS

| CN | 107798327 A | 3/2018 |
|---|---|---|
| CN | 108388896 A | 8/2018 |

(Continued)

OTHER PUBLICATIONS

Zhang et al, a robust attentional framework for license plate recognition in the wild, arXiv:2006.03919v2 Jun. 9, 2020.*

(Continued)

*Primary Examiner* — Xiao Liu
(74) *Attorney, Agent, or Firm* — Ladas & Parry, LLP

(57) ABSTRACT

A sequence identification method and apparatus, an image processing device and a storage medium, which belong to the field of image identification, are provided. The method includes: performing feature extraction on a to-be-identified target image through an image identification model to obtain a first feature map, where the first feature map includes a plurality of first image features; performing time sequence relationship extraction on the first feature map based on a convolutional neural network layer and a fully connected layer in the image identification model, to obtain a second feature map that merges upper and lower information included in the to-be-identified target image, where the second feature map includes a plurality of second image features; and performing character identification on the to-be-identified target image in parallel based on the plural- (Continued)

ity of first image features and the plurality of second image features to obtain a character sequence.

9 Claims, 6 Drawing Sheets

(58) Field of Classification Search
CPC .......... G06V 30/10; G06N 3/08; G06N 3/045; G06F 18/253
See application file for complete search history.

(56) References Cited

FOREIGN PATENT DOCUMENTS

| CN | 109299717 | A | | 2/2019 | |
|---|---|---|---|---|---|
| CN | 109992774 | A | | 7/2019 | |
| CN | 110084172 | A | * | 8/2019 | ......... G06K 9/00456 |
| CN | 111126410 | A | | 5/2020 | |
| CN | 111191663 | A | | 5/2020 | |
| CN | 111275046 | A | | 6/2020 | |
| CN | 111860682 | A | | 10/2020 | |
| WO | 2016197381 | A1 | | 12/2016 | |

OTHER PUBLICATIONS

Wang et al, FACLSTM: ConvLSTM with focused attention for scene text recognition, Special Focus on Deep Learning for Computer Vision, vol. 63, No. 120103, Jan. 15, 2020.*

Zuo et al, natural scent text recognition based on encoder-decoder framework, IEEE Access, vol. 7, pp. 62616-62623 (Year: 2019).*

Zhao et al, Fully-Convolutional Intensive Feature Flow Neural Network for Text Recognition, arXiv:1912.06446 (Year: 2020).*

European Patent Office, Extended European Search Report Issued in Application No. 21851002.2, Dec. 19, 2023.

State Intellectual Property Office of the People's Republic of China, Office Action and Search Report Issued in Application No. 202010751330.X, Jun. 1, 2023, 11 pages. (Submitted with Machine Translation).

State Intellectual Property Office of the People's Republic of China, Office Action and Search Report Issued in Application No. 202010751330.X, Jan. 17, 2024, 10 pages. (Submitted with Machine Translation).

Gao Fei et al:"EDF-LPR: a new encoder-decoder framework for licenseplate recognition", IET Intelligent Transport Systems, The Institution of Engineering and Technology, 2020, vol. 14, No. 8, Jun. 30, 2020, 11 pages.

Linjiang Zhang et al, "A Robust Attentional Framework for License Plate Recognition in the Wild", IEEE Transactions on Intelligent Transportation Systems, vol. 22, No. 11 , Jun. 18, 2020.

Chen-Yu Lee et al, "Recursive Recurrent Nets with Attention Modeling for OCR in the Wild", Jun. 27, 2016, IEEE Conference on Computer Vision and Pattern Recognition.

Han Lin et al, "Review of Scene Text Detection and Recognition", Archives of Computational Methods in Engineering, vol. 27, No. 2, Jan. 11, 2019, 27:433-454, https://doi.org/10.1007 /sl 1831-019-09315-1.

International Search Report (ISR) for PCT Application No. PCT/CN2021/109764, mailed on Oct. 26, 2021 and its English translation provided by WIPO.

Written Opinion (WOSA) for PCT Application No. PCT/CN2021/109764, mailed on Oct. 26, 2021 and its English machine translation by WIPO.

* cited by examiner

SEQUENCE RECOGNITION METHOD AND APPARATUS, IMAGE PROCESSING DEVICE, AND STORAGE MEDIUM

CROSS REFERENCE TO RELATED APPLICATIONS

The present disclosure is a U.S. national phase of International Application No. PCT/CN2021/109764 filed on Jul. 30, 2021, which claims priority to Chinese Patent Application No. 202010751330.X entitled "Sequence Recognition Method and Apparatus, Image Processing Device and Storage Medium" filed on Jul. 30, 2020, the entire contents of which are incorporated herein by reference.

TECHNICAL FIELD

The present disclosure relates to the technical field of image identification, particularly to a sequence recognition/identification method and apparatus, an image processing device and a storage medium.

BACKGROUND

With the development of image identification technologies, using image identification models for sequence identification has become more and more widely applied. For example, image identification models are used to identify license plate numbers, barcodes and so on. However, since the license plate numbers or the barcodes are generally in a plural form, they are identified in a serial identification manner, resulting in low identification efficiency. Therefore, a sequence identification method with improved identification efficiency is needed.

SUMMARY

In the embodiments of the present disclosure, there is provided a sequence identification method and apparatus, an image processing device and a storage medium, which can improve the efficiency of sequence identification. The described technical solutions are as follows:

In one aspect, there is provided a sequence identification method, including:
performing feature extraction on a to-be-identified target image through an image identification model to obtain a first feature map, where the first feature map includes a plurality of first image features;
performing time sequence relationship extraction on the first feature map based on a convolutional neural network layer and a fully connected layer in the image identification model, to obtain a second feature map that merges upper and lower information included in the to-be-identified target image, where the second feature map includes a plurality of second image features; and
performing character identification on the to-be-identified target image in parallel based on the plurality of first image features and the plurality of second image features to obtain a character sequence.

In some examples, performing the character identification on the to-be-identified target image in parallel based on the plurality of first image features and the plurality of second image features to obtain the character sequence, includes:
determining a plurality of sets of image features based on the plurality of first image features and the plurality of second image features, where each of the plurality of sets of image features includes a first image feature and a second image feature at a same feature location;
performing character identification on the plurality of sets of image features in parallel; and
generating the character sequence based on a plurality of identified characters.

In some examples, performing the character identification on the plurality of sets of image features in parallel, includes:
performing matrix operation on the first image features and the second image features in the plurality of sets of image features to obtain a third feature map, where the third feature map includes a plurality of third image features, a third image feature is obtained by performing matrix operation on the first image feature and the second image feature at the same feature location; and
decoding the plurality of third image features in parallel to identify a character corresponding to each image feature.

In some examples, the first image feature is $B \times C1 \times H \times W$ in size; the second image feature is $B \times T \times H \times W$ in size; the third image feature is $B \times C1 \times T$ in size;
where B represents a batch parameter of the image identification model, C1 represents a number of feature channels of the image identification model; H represents a height of a feature map, W represents a width of the feature map, and T represents a predicted sequence length.

In some examples, performing the time sequence relationship extraction on the first feature map based on the convolutional neural network layer and the fully connected layer in the image identification model to obtain the second feature map that merges the upper and lower information included in the to-be-identified target image, includes:
transforming a number of channels of the first feature map through the convolutional neural network layer, to obtain a fourth feature map that merges the upper and lower information included in the to-be-identified target image; and
mapping channels in the fourth feature map to a preset sequence length through the fully connected layer to obtain the second feature map.

In some examples, the method further includes:
acquiring a plurality of sample images, where each of the plurality of sample images labels a character sequence in the sample image; and
training the image identification model through a convolutional neural network, based on the plurality of sample images and the character sequence labeled in each of the plurality of sample images.

In a further aspect, there is provided an image processing device which includes a processor and a memory with at least one program code stored thereon, where the at least one program code is loaded and executed by the processor to implement the followings including:
performing feature extraction on a to-be-identified target image through an image identification model to obtain a first feature map, where the first feature map includes a plurality of first image features;
performing time sequence relationship extraction on the first feature map based on a convolutional neural network layer and a fully connected layer in the image identification model, to obtain a second feature map that merges upper and lower information included in the to-be-identified target image, where the second feature map includes a plurality of second image features; and performing character identification on the to-be-identified target image in parallel based on the plurality of first image features and the plurality of second image features to obtain a character sequence.

In some examples, the at least one program code is loaded and executed by the processor to implement the followings including:

determining a plurality of sets of image features based on the plurality of first image features and the plurality of second image features, where each of the plurality of sets of image features includes a first image feature and a second image feature at a same feature location;

performing character identification on the plurality of sets of image features in parallel; and generating the character sequence based on a plurality of identified characters.

In some examples, the at least one program code is loaded and executed by the processor to implement the followings including:

performing matrix operation on the first image features and the second image features in the plurality of sets of image features to obtain a third feature map, where the third feature map includes a plurality of third image features, a third image feature is obtained by performing matrix operation on the first image feature and the second image feature at the same feature location; and decoding the plurality of third image features in parallel to identify a character corresponding to each image feature.

In some examples, the first image feature is B×C1×H×W in size; the second image feature is B×T×H×W in size; the third image feature is B×C1×T in size;

where B represents a batch parameter of the image identification model, C1 represents a number of feature channels of the image identification model; H represents a height of a feature map, W represents a width of the feature map, and T represents a predicted sequence length.

In some examples, the at least one program code is loaded and executed by the processor to implement the followings including:

transforming a number of channels of the first feature map through the convolutional neural network layer, to obtain a fourth feature map that merges the upper and lower information included in the to-be-identified target image; and mapping channels in the fourth feature map to a preset sequence length through the fully connected layer to obtain the second feature map.

In some examples, the at least one program code is loaded and executed by the processor to further implement the followings including:

acquiring a plurality of sample images, where each of the plurality of sample images labels a character sequence in the sample image; and training the image identification model through a convolutional neural network, based the plurality of sample images and the character sequence labeled in each of the plurality of sample images.

On another further aspect, there is provided a non-transitory computer-readable storage medium where at least one program code is loaded and executed by a processor to perform the sequence identification method described in any one of the above-mentioned possible embodiments.

On the other hand, there is provided a computer program product including at least one computer program that, when executed by a processor, implements the sequence identification method described in any one of the above-mentioned possible embodiments.

In the embodiments of the present application, in the process of performing sequence identification on the target image, the first feature map of the target image is subjected to time sequence relationship extraction, and the second feature map that merges the upper and lower information included in the target image is thus obtained; such that the second feature map includes the time sequence relationship between the characters; so as to perform character identification in parallel based on the first feature map and the second feature map, thereby improving the efficiency of character identification.

BRIEF DESCRIPTION OF THE DRAWINGS

In order to more clearly illustrate the technical solutions in the embodiments of the present disclosure, the drawings used in the following description of the embodiments will be briefly introduced below. The drawings in the following description are only some embodiments of the present disclosure. For those of ordinary skill in the art, other drawings can also be obtained from these drawings without exerting any creative labor.

DETAILED DESCRIPTION OF THE EMBODIMENTS

In order to make the objectives, technical solutions and advantages of the present disclosure clearer, the embodiments of the present disclosure will be further described in detail below with reference to the companying drawings.

The terms "first", "second", "third" and "fourth" in the description and claims of the present disclosure and the companying drawings are used to distinguish between different objects, rather than to describe a particular order. Furthermore, the terms "include" and "have" and any variations thereof, are intended to cover non-exclusive inclusion. For example, processes, methods, systems, products or devices including a series of steps or units are not limited to listed steps or units, but in some examples also include unlisted steps or units, or in some examples also include other steps or units inherent to these processes, methods, products or devices.

Figure 1:
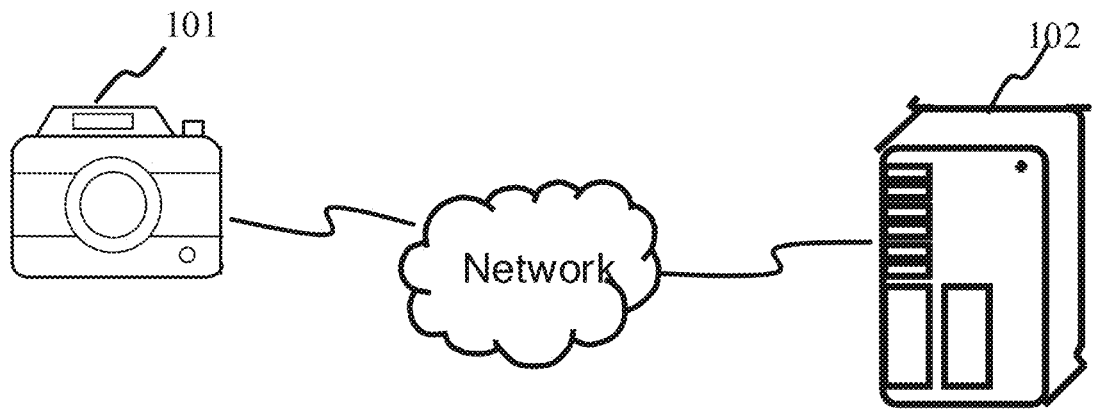
FIG. 1 is a schematic diagram of an implementation environment provided by an embodiment of the present disclosure.

FIG. 1 is a schematic diagram of an implementation environment provided by an embodiment of the present disclosure. Referring to FIG. 1, the implementation environment includes an image capturing device 101 and an image processing device 102; the image capturing device 101 and the image processing device 102 are connected via a wireless or wired network.

The image capturing device 101 is used to capture a target image and transmit the target image to the image processing device 102. The image processing device 102 is used for performing sequence identification on the target image. Moreover, the image processing device 102 performs sequence identification on the target image through an image identification model. Therefore, the image identification model is to be stored in the image processing device 102. In some examples, the image identification model is trained and obtained on the image processing device 102, or the image identification model is trained on another device and later loaded on the image processing device 102.

In the embodiments of the present disclosure, the image capturing device 101 is any device with an image capturing function such as a mobile phone, a tablet, a computer, a camera or a webcam. The image processing device 102 may be any device with an image processing function, such as a terminal or a server. In some examples, the image processing device 102 is a server, a cluster of servers 103 consisting of a plurality of servers 103, or a cloud server 103. In the embodiments of the present disclosure, this is not specifically limited.

The sequence identification method according to the present embodiments of the present disclosure can be applied in various practical application scenarios, and the actual technical effects of the embodiments of the present disclosure is described below in combination with three application scenarios:

(1) An application scenario of license plate number identification in a parking lot: in the scenario of license plate number identification, in response to a vehicle entering into the parking lot, the image capturing device 101 captures a first target image including license plate numbers of the vehicle, and sends the first target image to the image processing device 102. The image processing device 102 receives the first target image, identifies the license plate numbers from the first target image, and stores the license plate numbers and the entry time in association.

In response to the vehicle exiting the parking lot, the image capturing device 101 again captures a second target image including the license plate numbers of the vehicle, and sends the second target image to the image processing device 102. The image processing device 102 receives the second target image, identifies the license plate numbers from the second target image, and according to the license plate numbers, searches for the entry time associated with the license plate numbers from a relationship between the license plate numbers and the entry time; and charges the vehicle according to the entry time and the exit time of the vehicle. As such, automatic charging of vehicles can be realized.

(2) An application scenario of barcode identification: in the barcode identification scenario, when a customer purchases a commodity for checkout, the image capturing device 101 captures a target image including a barcode, and sends the target image to the image processing device 102. The image processing device 102 receives the target image, identifies numbers in the barcode from the target image, obtains a character sequence, determines the price of the commodity according to the character sequence, and then charges the customer accordingly.

In the barcode identification scene, the image capturing device 101 is a cashier's POS machine or a self-service cashier device.

(3) An application scenario of text identification: in the scenario of text identification, a user sees a piece of text information of interest, and the user captures a target image containing the text information through the image capturing device 101, and sends the target image to the image processing device 102. The image processing device 102 receives the target image, identifies the text information from the image, and returns the text information to the image capturing device 101, thereby realizing automatic identification of the text information from the image without requiring the user to manually input the text information, which improves the efficiency.

It should be noted that, in addition to the above applications, the method also includes other applications, such as application in the scenario of digital identification and so on. In the embodiments of the present disclosure, this is not specifically limited.

It should be further noted that, in the implementation environment, the image capturing device 101 and the image processing device 102 are illustrated as different devices. In some examples, the image capturing device 101 and the image processing device 102 are a same device, and both of them are called for example the image processing device 102 which is used for capturing a target image and performing sequence identification therefor. Correspondingly, the image processing device 102 has not only an image processing function, but also an image capturing function.

Figure 2:
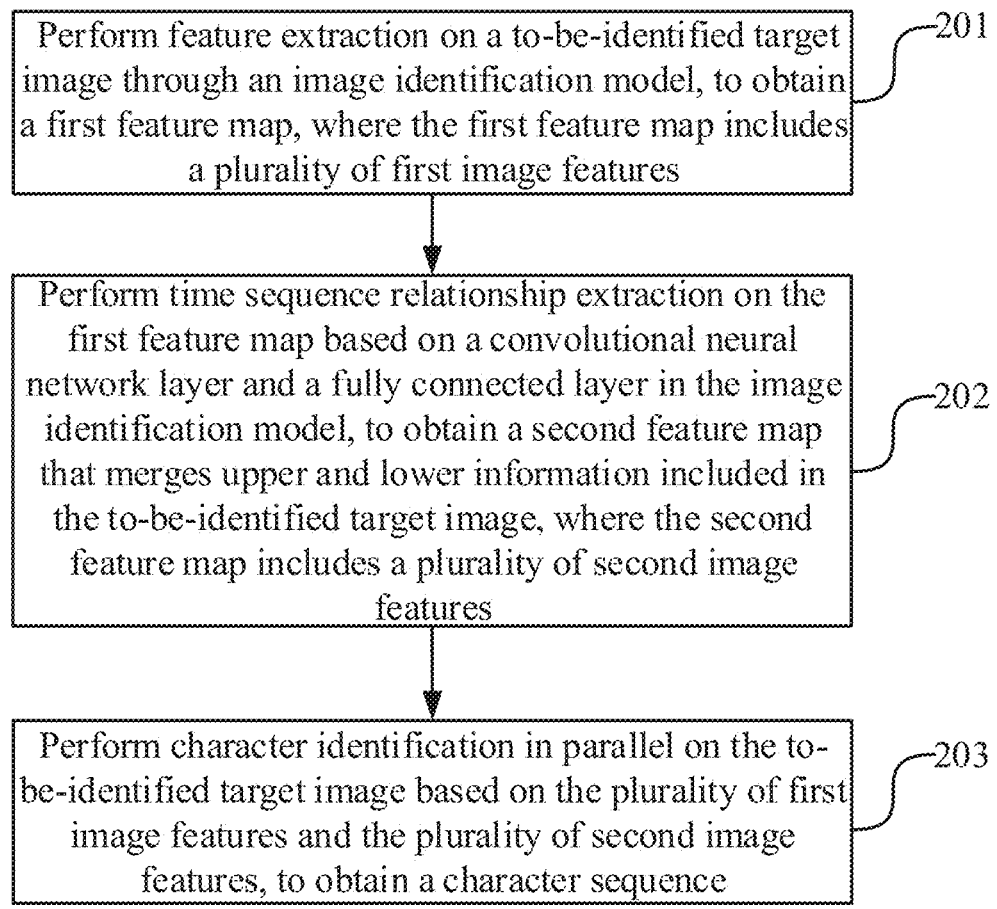
FIG. 2 is a flowchart of a sequence identification method provided by an embodiment of the present disclosure.

FIG. 2 is a flowchart of a sequence identification method provided in the embodiment of the present disclosure. Referring to FIG. 2, the embodiment includes 201 to 203.

At 201, feature extraction is performed on a to-be-identified target image through an image identification model, to obtain a first feature map, where the first feature map includes a plurality of first image features.

At 202, time sequence relationship extraction is performed on the first feature map based on a convolutional neural network layer and a fully connected layer in the image identification model, to obtain a second feature map that merges upper and lower information included in the to-be-identified target image, where the second feature map includes a plurality of second image features.

At 203, character identification is performed in parallel on the to-be-identified target image based on the plurality of first image features and the plurality of second image features, to obtain a character sequence.

In some examples, performing the character identification in parallel on the to-be-identified target image based on the plurality of first image features and the plurality of second image features to obtain a character sequence, includes:
  determining a plurality of sets of image features based on the plurality of first image features and the plurality of second image features, where each of the plurality of sets of image features includes a first image feature and a second image feature at a same feature location;
  performing character identification on the plurality of sets of image features in parallel; and generating the character sequence based on a plurality of identified characters.

In some examples, performing the character identification on the plurality of sets of image features in parallel, includes:

performing matrix operation on the first image features and the second image features in the plurality of sets image features to obtain a third feature map, where the third feature map includes a plurality of third image features, a third image feature is obtaining by performing matrix operation on the first image feature and the second image feature at the same feature location;

decoding the plurality of third image features in parallel to identify a character corresponding to each image feature.

In some examples, the first image feature is B×C1×H×W in size, the second image feature is B×T×H×W in size, and the third image feature is B×C1×T in size;

where B represents a batch parameter of the image identification model; C1 represents s number of feature channels of the image identification model; H represents a height of a feature map; W represents a width of the feature map; and T represents a preset sequence length.

In some examples, performing the time sequence relationship extraction on the first feature map based on the convolutional neural network layer and the fully connected layer in the image identification model to obtain the second feature map that merges the upper and lower information included in the to-be-identified target image, including:

transforming a number of channels of the first feature map through the convolutional neural network layer, to obtain a fourth feature map that merges the upper and lower information included in the to-be-identified target image; and mapping channels in the fourth feature map to a preset sequence length through the fully connected layer to obtain the second feature map.

In some examples, the method further includes:

acquiring a plurality of sample images, where each of the plurality of sample images labels a character sequence in the sample image; and training the image identification model through a convolutional neural network, based on the plurality of sample images and the character sequence labeled in each of the plurality of sample images.

In the embodiment of the present disclosure, in the process of performing sequence identification on the target image, the first feature map of the target image is subjected to time sequence relationship extraction, to obtain a second feature map that merges upper and lower information included in the target image; such that the second feature map includes the time sequence relationship between the characters; so as to perform character identification in parallel based on the first feature map and the second feature map, thereby improving the efficiency of character identification.

Figure 3:
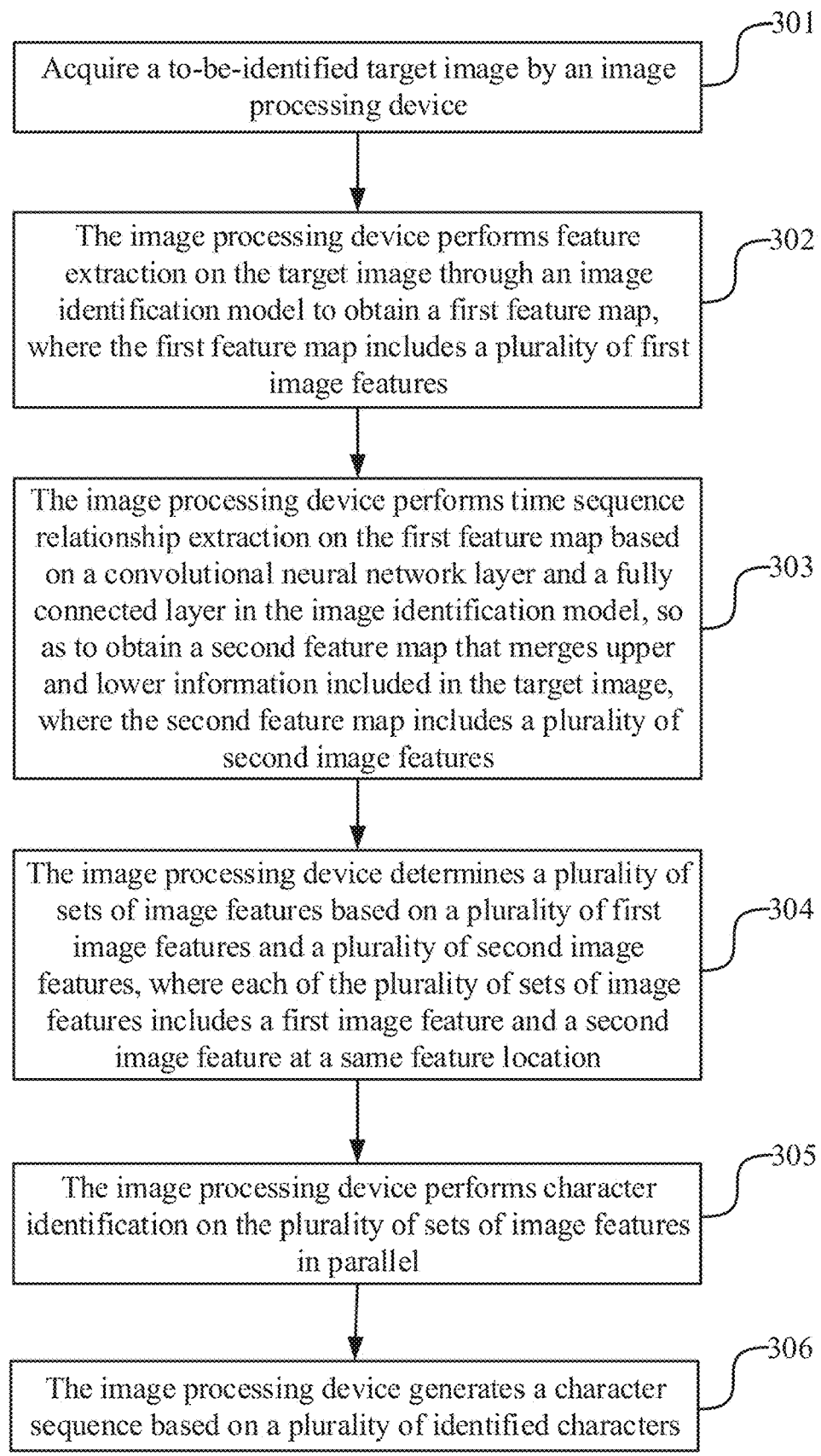
FIG. 3 is a flowchart of another sequence identification method provided by an embodiment of the present disclosure.

FIG. 3 is a flowchart of a sequence identification method provided in an embodiment of the present disclosure. Referring to FIG. 3, this embodiment includes 301 to 306.

At 301, a to-be-identified target image is acquired by an image processing device.

The target image may be any image that includes a character sequence having a series of one or more of numbers, letters and characters.

In an example, in response to the image processing device provided with an image capturing function, the image processing device captures a target image in this step. For example, the sequence identification method is applied in a scenario of identifying license plate numbers in a parking lot; then, in response to a vehicle entering or exiting the parking lot, the image capturing device captures a target image including the license plate numbers. For another example, the sequence identification method is applied to the scenario of barcode identification; then, when a customer purchases a commodity for checkout, the image capturing device captures a target image containing the barcode of the commodity. For yet another example, the sequence identification method is applied in the scenario of text identification; then, when a user sees a text of interest, he or she uses the image capturing device for image capturing; accordingly, the image capturing device captures a target image containing the text.

In another example, in response to the image processing device not provided with an image capturing function, the image processing device receives a target image sent by an image capturing device. The scenarios in which the image capturing device captures images are the same as those of the above-described image processing device, and thus will not be described in details here. For example, the target image is an image that includes the character sequence of FLASH.

In another example, a target image is stored in advance in an image library in the image processing device. Accordingly, the step in which the image processing device acquires a to-be-identified target image include: the image capturing device displays an image selection interface including an image index of each image in the image library; a user can select the image index to select the image. The image processing device acquires a selected image index and based on it, acquires the target image corresponding to the image index from the image library.

At 302, the image processing device performs feature extraction on the target image through an image identification model to obtain a first feature map, where the first feature map includes a plurality of first image features.

The image identification model includes a feature extracting module; after the image capturing device acquires the target image, the target image is input into the image identification model, and the feature extracting module in the image identification model performs feature extraction on the target image to obtain a first feature map. The feature extracting module is trained by CNN (Convolutional Neural Network).

CNN is a feed-forward artificial neural network whose neurons can respond to surrounding units within a limited coverage range, and can effectively extract structural information of the image through weight sharing and feature aggregation.

Figure 4:
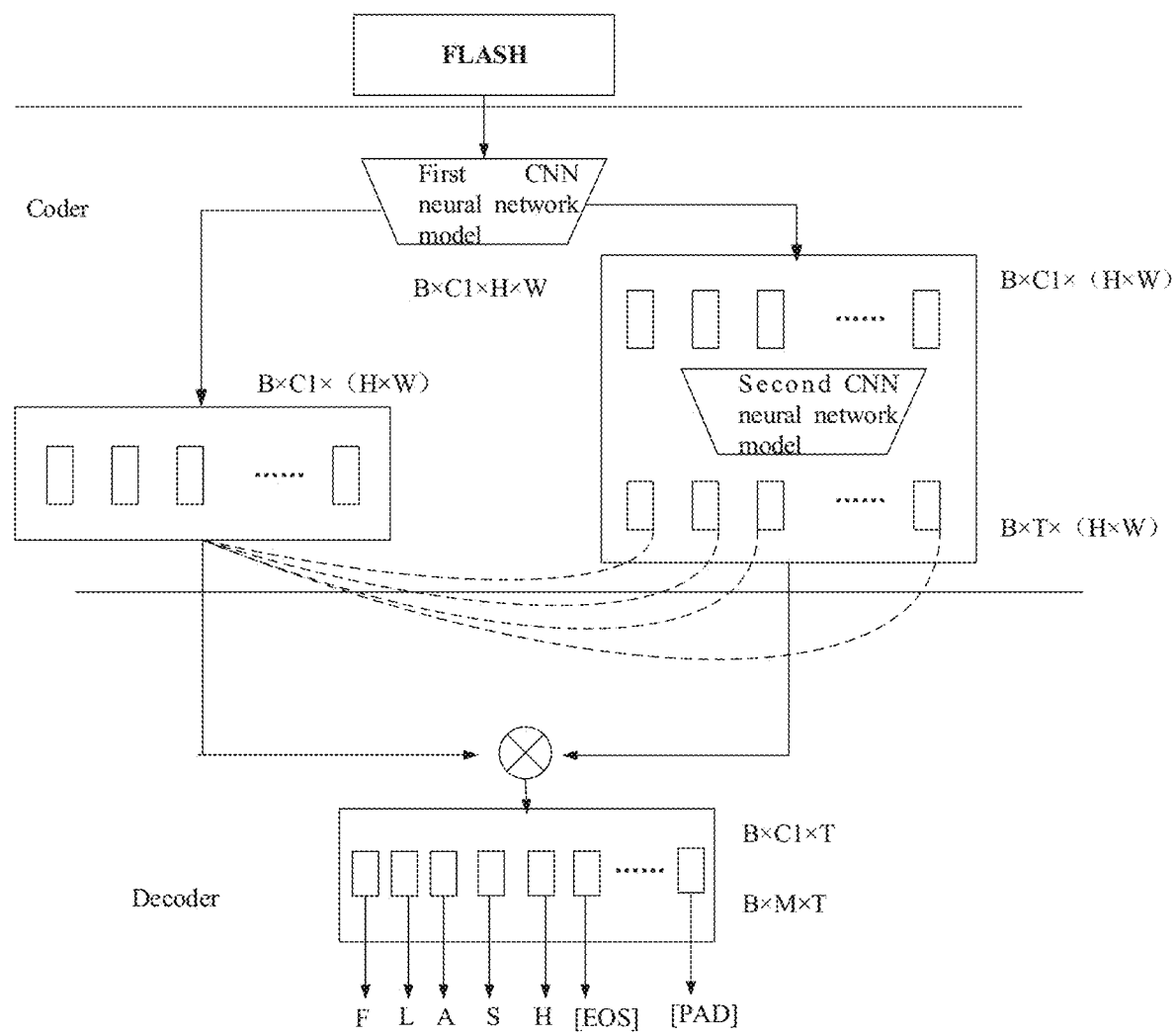
FIG. 4 is a schematic diagram of a sequence identification method provided by an embodiment of the present disclosure.

For example, the feature extracting module in the image identification model is a first CNN neural network model. Referring to FIG. 4, the image processing device inputs the target image containing FLASH into the first CNN neural network model, and a first feature map is output, where the first feature map includes a plurality of first image features. A first image feature is B×C1×H×W in size, where B represents a batch parameter (Batch size) of the image identification model, C1 represents a number of feature channels of the image identification model, H represents a height of the first feature map and W represents a width of the first feature map.

It should be noted that the image processing device can perform feature extraction on the entire target image through the image identification model, and also cannot perform feature extraction on the entire target image. Instead, it firstly identifies an image area where the sequence is located, and then extracts features only from that image area where the sequence is located to obtain the first feature map. Therefore, the time required for feature extraction is reduced and the sequence identification efficiency is improved.

The process for the image processing device to perform feature extraction on the image area where sequence is located through the image identification model is as follows: the image processing device intercepts a part of the target image that corresponds to the image area where the sequence is located; the part of image is input into the image identification model and subjected to feature extraction through the image identification model, so as to obtain the first feature map.

At 303, the image processing device performs time sequence relationship extraction on the first feature map based on a convolutional neural network layer and a fully connected layer in the image identification model, so as to obtain a second feature map that merges upper and lower information included in the target image, where the second feature map includes a plurality of second image features.

The upper and lower information included in the target image refers to a time sequence relationship of the sequence. The time sequence relationship extraction at least includes a process of channel number change and a process of sequence length variation. The process of channel number change includes increasing or decreasing the number of channels; the process of sequence length variation refers to increasing the number of feature channels of the first feature map. Correspondingly, the number of feature channels included in the first feature map is different from that included in second feature map, and the number of features channels of the second feature map is greater than that included in the first feature map.

The image identification module includes an encoding module which is a neural network model trained by the CNN network. The image processing device extracts the time sequence relationship of the first feature map through a second CNN neural network model, and transforms a number of channels of the first feature map into a preset sequence length. For example, referring again to FIG. 4 which illustrates an example with the encoding module being a coder. The size of the second feature map is B×T×H×W. T represents the preset sequence length.

In an example, the encoding module includes a fully connected layer (FC) and at least one convolutional neural network layer. For example, the encoding module includes 2 convolutional neural network layers, each with a convolutional kernel with a kernel of 3 and a stride of 3.

This step is implemented through the following steps (1) and (2).

(1) The image processing device transforms a number of channels of the first feature map through the convolutional neural network layer to obtain a fourth feature map that merges the upper and lower information included in the target image.

In response to the encoding module including one convolutional neural network layer, the image processing module transforms the number of channels of the first feature map through the convolutional neural network layer to obtain the fourth feature map. In response to the encoding module including a plurality of convolutional neural network layers, the image processing device first transforms the number of channels of the first feature map through one convolutional neural network layer, and inputs the obtained result to a next convolutional neural network layer to transform the obtained result through the next convolutional neural network layer until this processing is completed through a plurality of convolutional neural network layers, so as to obtain the fourth feature map.

For example, the encoding module includes two convolutional neural network layers, namely a convolutional neural network layer 1 and a convolutional neural network layer 2; the image processing device transforms the number of channels of the first feature map through the convolutional neural network layer 1 to obtain a fifth feature map, and transforms a number of channels of the fifth feature map through the convolutional neural network layer 2 to obtain the fourth feature map.

Figure 5:
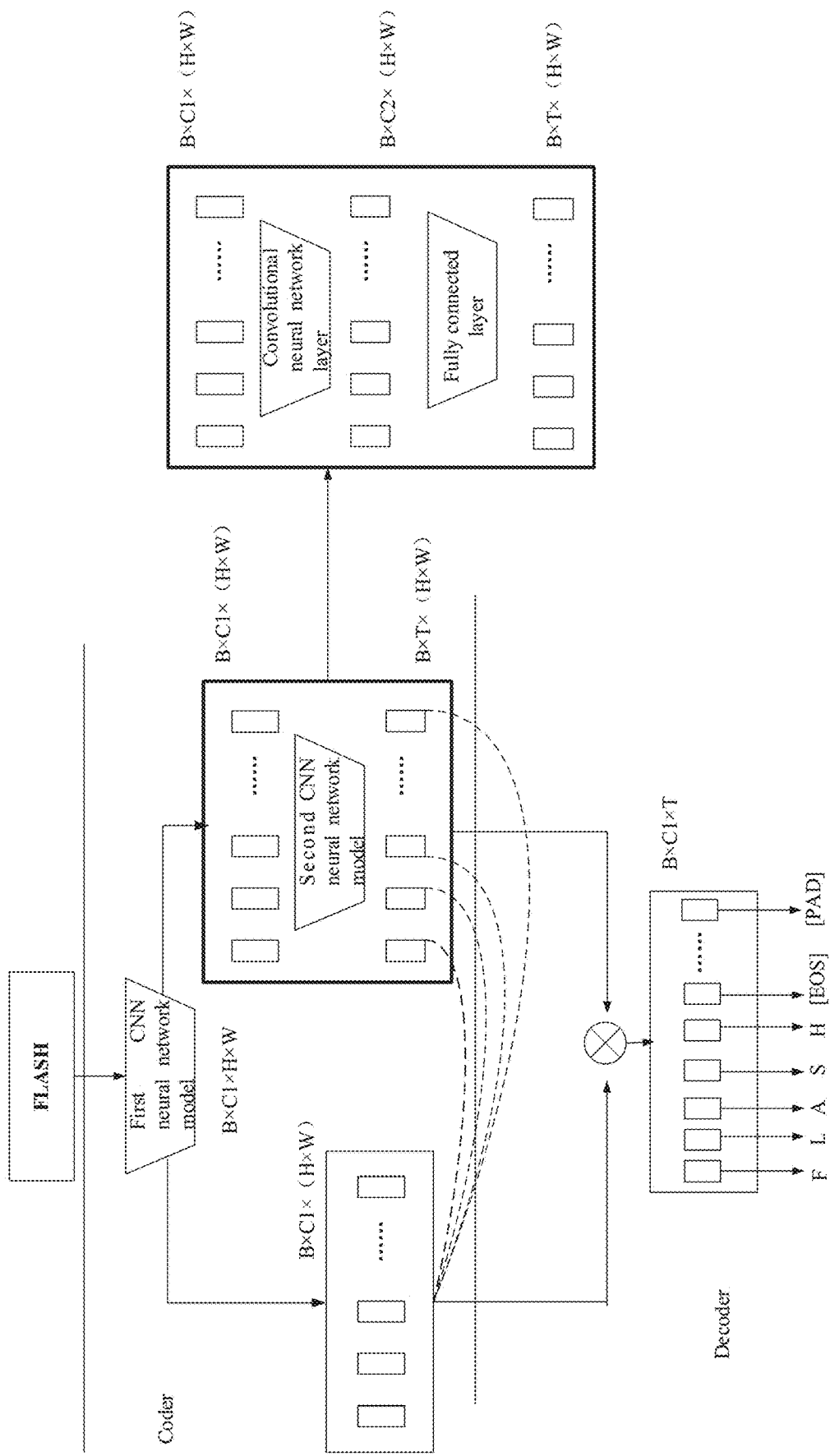
FIG. 5 is a schematic diagram of another sequence identification method provided by the embodiment of the present disclosure.

For example, according to FIG. 5, the image processing device transforms the number of channels of the first feature map through a convolutional neural network layer to obtain the fourth feature map with a number of channels C2. Accordingly, an image feature included in the fourth feature map is B×C2×H×W in size.

(2) The image processing device maps the channels in the fourth feature map to the preset sequence length through the fully connected layer to obtain the second feature map.

In some examples, the preset sequence length can be set and changed as needed; and the preset sequence length is a maximum number of characters that can be identified by the image identification model. For example, if the preset sequence length is 5, the image identification model can identify a character sequence with up to 5 characters. For another example, if the preset sequence length is 10, the image identification model can identify a character sequence with up to 10 characters.

For example, further referring to FIG. 5, the image processing device maps the channels in the fourth feature map to the preset sequence length through the fully connected layer, so as to obtain the second feature map. The number of channels in the second feature map is T; and correspondingly, the second image feature included in the second feature map is B×T×H×W in size.

It should be noted that the width and height of the second image feature in the second feature map are same or different from the width and height of the first image feature in the first feature map, respectively. Moreover, the preset sequence length and the number of channels in the first feature map are same or different. In the embodiment of the present disclosure, it is described, as an example, that the width and height of the second feature map are respectively same with the width and height of the first feature map, but the preset sequence length is different from the number of channels of the first feature map.

At 304, the image processing device determines a plurality of sets of image features based on a plurality of first image features and a plurality of second image features, where each of the plurality of sets of image features includes a first image feature and a second image feature at a same feature location.

For any first image feature in the first feature map, the image processing device determines a feature location of the first image feature in the first feature map, and according to the feature location, searches out a second image feature from the second feature map at that feature location, so as to form the first image feature and the second image feature into a set of image features. Similarly, the image processing device searches sequentially according to this method until each of the first image features in the first feature map is matched to a corresponding second image feature, and a plurality of sets of image features are thus obtained.

It should be noted that, in the above description, it is illustrated by matching the first image features in the first feature map to the second image features in the second feature map. The electronic device can also match the second image features in the second feature map to the first feature map. The implementation process is similar to the process of matching the first image features in the first feature map to the second feature map in the second feature map, and thus will not be described in detail here.

For example, further referring to FIG. 4, the first feature map includes N first image features, which are respectively a first image feature 1, a first image feature 2, a first image feature 3 . . . , and a first image feature N. The second feature map includes N second image features, which are respectively a second image feature 1, a second image feature 2, a second image feature 3 . . . , and a second image feature N. The image processing device forms the first image feature 1 and the second image feature 1 into a set of image features, the first image feature 2 and the second image feature 2 into a set of image features, the first image feature 3 and the second image feature 3 into a set of image features . . . , and the first image feature N and the second image feature N into a set of image features.

At 305, the image processing device performs character identification on the plurality of sets of image features in parallel.

This step is implemented through the following steps (1) and (2).

(1) The image processing device performs matrix operation on the first image features and the second image features in the plurality of sets of image features, to obtain a third feature map. The third feature map includes a plurality of third image features, where a third image feature is obtained by performing matrix operation on a first image feature and a second image feature at a same feature location.

A first image feature is B×C1×H×W in size, a second image feature is B×T×H×W in size, and a third image feature is B×C1×T in size;

B represents a batch parameter of the image identification model; C1 represents a number of feature channels of the image identification model; H represents a height of a feature map; W represents a width of the feature map; and T represents a predicted sequence length.

Figure 6:
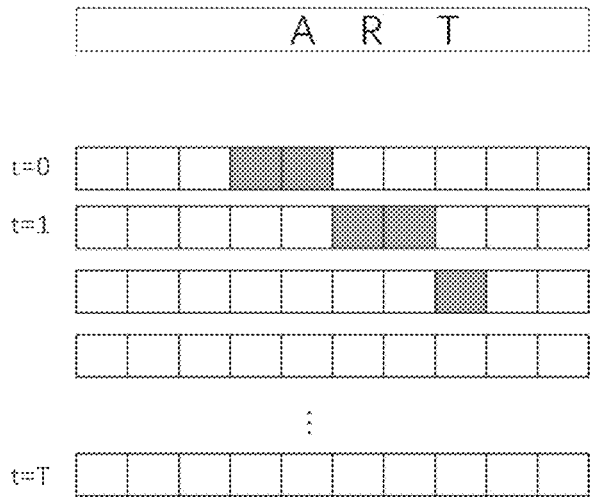
FIG. 6 is a schematic diagram of another sequence identification method provided by an embodiment of the present disclosure.

For example, the visualization of the third feature map is shown in FIG. 6. When the batch parameter of the image identification model is ignored and a character string "ART" is identified individually, in response to W=10 and H=1, the following output result may be generally obtained as shown. T output feature maps in turn focus on the character locations of "A", "R", and "T", and have high response values at feature locations corresponding to those three characters. These responses are subjected to matrix multiplication with results of the feature vision module, to obtain a feature map of B×C1×T, which can be then directly used as an ordinary classification task for FC+Softmax classification.

(2) The image processing device decodes the plurality of third image features in parallel to identify the characters corresponding to the respective image features.

The image identification model includes a decoding module. The image processing device identifies the plurality of sets of image features in parallel through the decoding module to obtain a plurality of characters. The decoding module adopts a single-word classification prediction method, and perform prediction based on a plurality of third image features in parallel. Therefore, a plurality of identified characters can be predicted and output in parallel, without waiting for the output and change of state at a previous moment.

For example, continuously referring to FIG. 4, which illustrates the decoding module as a decoder. The image processing device decodes the plurality of third image features in parallel, and obtains the characters F, L, A, S, H, [EOS] . . . and [PAD] corresponding to respective feature locations. [EOS] is an end identifier, which indicates the end of character sequence identification. Namely, the characters before [EOS] belongs to a character sequence. [PAD] is an end bit, which indicates the end of character identification. Namely, the whole character identification is completed.

In the embodiments of the present disclosure, CNN and matrix operation are used to replace the commonly used Seq-to-Seq technology (such as RNN). The sequence identification depends on the context of temporal modeling to realize variable-length sequence identification, which can realize parallel character identification and improve efficiency.

At 306, the image processing device generates a character sequence based on a plurality of identified characters.

Different image identification models have different preset sequence lengths. In response to that the number of characters included in the target image is same as the preset sequence length, the image processing device forms the plurality of identified characters into a character sequence. In response to that the number of characters contained in the target image is different from the preset sequence length, the image processing device forms a character sequence from the plurality of characters before the end identifier.

For example, continuously referring to FIG. 4 with a plurality of characters are F, l, a, s, h, [EOS] . . . , and [PAD]. The image processing device forms a character sequence consisting of the characters before [EOS]. Correspondingly, the character sequence identified by the image processing device is Flash.

In the embodiments of the present disclosure, in the process of sequence identification on the target image, the first feature map of the target image is subjected to time sequence relationship extraction to obtain a second feature map that merges upper and lower information included in the target image. As such, the second feature map contains time sequence relationships between the respective characters. It is thus possible to carry out character identification in parallel based on the first feature map and the second feature map, to improve the character identification efficiency.

Figure 7:
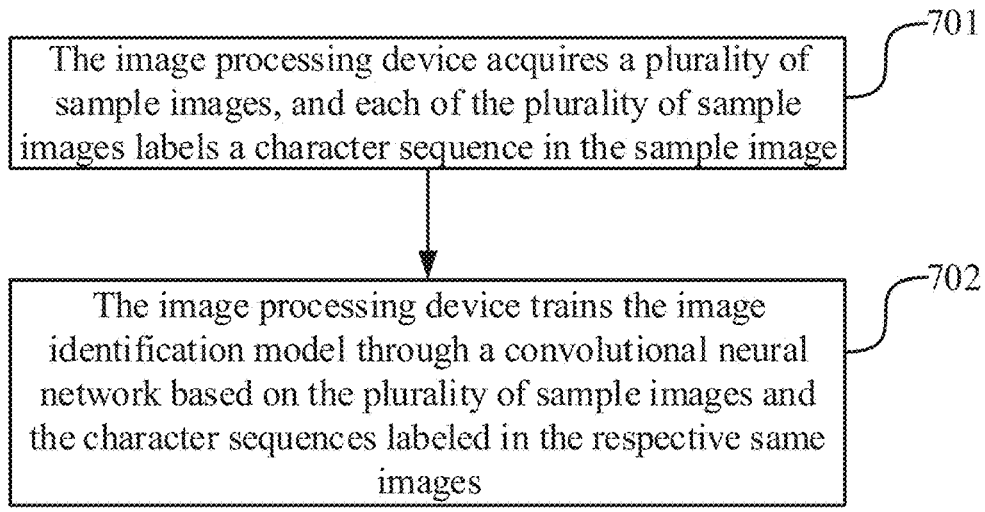
FIG. 7 is a flowchart of a training method for an image identification model provided by an embodiment of the present disclosure.

Before the image processing device identifies the target image through the image identification model, the image processing device trains the image identification model. The process of the image processing device training the image identification model is shown in FIG. 7, which includes 701 and 702.

At 701, the image processing device acquires a plurality of sample images, and each of the plurality of sample images labels a character sequence in the sample image.

At 702, the image processing device trains the image identification model through a convolutional neural network based on the plurality of sample images and the character sequences labeled in the respective same images.

This step is implemented through the following steps (1) to (4).

(1) The image processing device performs feature extraction on each of the plurality of sample images based on an initial model to obtain a sixth feature map for each of the plurality of sample images, where the sixth feature map includes a plurality of sixth image features.

(2) The image processing device performs time sequence relationship extraction on the sixth feature map of each of the plurality of sample images through a convolutional neural network layer and a fully connected layer in the initial model, and obtains a seventh feature map for each of the plurality of sample images. The seventh feature map includes a plurality of seventh image features, and the seventh feature map of each of the plurality of sample images merges the upper and lower information included in the sample image.

(3) The image processing equipment performs character identification in parallel on each sample image based on the sixth and seventh feature maps of each sample image, and obtains a predicted character sequence of each sample image;

(4) The image processing device updates the initial model according to the predicted character sequence and the labeled character sequence of each sample image, to obtain an image identification model.

It should be noted that the implementation process of steps (1) to (4) is similar to steps 302-306 and thus will not be described herein.

In related arts, when training image identification models, RNN codec is generally used. However, the RNN codec framework has brought limitations (such as poor parallelism, slow training and testing speed, training being greatly affected by initialization, difficulty in fitting to a better parameter model, and unfriendly hardware platform, etc.). This solution has established a sequence identification framework without relying on RNN. The image identification model is trained through the convolutional neural network, which is friendly to the hardware platform. The parallel encoding and decoding modules of the string features improves efficiency and makes performance stably improved, and flexible and easy to use.

Figure 8:
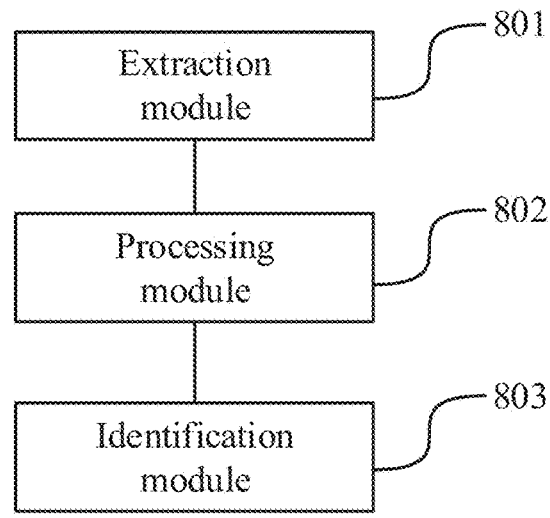
FIG. 8 is a block diagram of a sequence identification apparatus provided by an embodiment of the present disclosure.

FIG. 8 is a block diagram of a sequence identification apparatus provided in the embodiment of the present disclosure. Referring to FIG. 8, the apparatus includes:

an extraction module 801, configured to perform feature extraction on a to-be-identified target image through an image identification model, so as to obtain a first feature map, where the first feature map includes a plurality of first image features;

a processing module 802, configured to perform time sequence relationship extraction on the first feature map based on a convolutional neural network layer and a fully connected layer in the image identification model, to obtain a second feature map that merges upper and lower information included in the target image, where the second feature map includes a plurality of second image features; and an identification module 803, configured to perform character identification on the to-be-identified target image in parallel based on the plurality of first image features and the plurality of second image features to obtain a character sequence.

In an example, the identification module 803 includes:

a determination unit, configured to determine a plurality of sets of image features based on the plurality of first image features and the plurality of second image features, where each of plurality of sets of image features includes a first image feature and a second image feature at a same feature location;

an identification unit, configured to perform character identification on the plurality of sets of image features in parallel; and a generation unit, configured to generate a character sequence based on a plurality of identified characters.

In another example, the identification unit is configured to:

perform matrix operation on the first image features and the second image features in the plurality of sets of image features to obtain a third feature map, where the third feature map includes a plurality of third image features, a third image feature is obtained by performing matrix operation on the first image feature and the second image feature at the same feature location; and decode the plurality of third image features in parallel to identify a character corresponding to each image feature.

In some examples, the first image feature is $B \times C1 \times H \times W$ in size; the second image feature is $B \times T \times H \times W$ in size; and the third image feature is $B \times C1 \times T$ in size;

where B represents a batch parameter of the image identification model, C1 represents a number of feature channels of the image identification model; H represents a height of a feature map, W represents a width of the feature map, and T represents a predicted sequence length.

In another example, the processing module 802 includes:

a transformation unit, configured to transform a number of channels of the first feature map through the convolutional neural network layer to obtain a fourth feature map that merges the upper and lower information included in the to-be-identified target image; and a mapping unit, configured to map channels in the fourth feature map to a preset sequence length through the fully connected layer to obtain the second feature map.

In another example, the apparatus further includes:

an acquiring module, configured to acquire a plurality of sample images, where each of the plurality of sample images labels a character sequence in the sample image; and a training module, configured to train the image identification model through a convolutional neural network based on the plurality of sample images and the character sequence labeled in each of the plurality of sample images.

In the embodiment of the present disclosure, in the process of sequence identification on the target image, the first feature map of the target image is subjected to time sequence relationship extraction to obtain a second feature map that merges upper and lower information included in the target image. As such, the second feature map contains time sequence relationships between the respective characters. It is thus possible to carry out character identification in parallel based on the first feature map and the second feature map, to improve the character identification efficiency.

It should be noted that the sequence identification apparatus provided by the above embodiment only illustrates the division of the above functional modules as an example for describing the sequence identification. In practical application, the above functions can be allocated to different functional modules as required. The internal structure of a terminal is divided into different functional modules to complete all or part of the functions described above. In addition, the sequence identification apparatus and the sequence identification method provided by the above embodiments belong to the same concept, and the specific implementation process thereof is detailed in the method embodiments, which will not be repeated herein.

Figure 9:
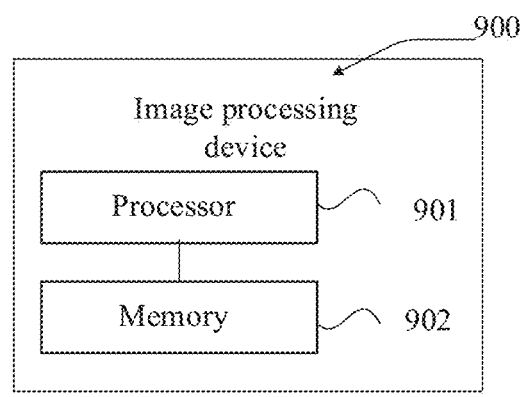
FIG. 9 is a block diagram of an image processing device provided by an embodiment of the present disclosure.

In response to the image processing device being a server, FIG. 9 is a block diagram of an image processing device 900 provided by an embodiment of the present disclosure. The image processing device may vary greatly due to different configurations or performances, and may include one or more processors (Central Processing Units, CPU) 901 and one or more memories 902. The memory 902 stores at least one instruction loaded by the processor 901 to execute the sequence identification method provided by the above-mentioned method embodiments. Of course, the image processing device may also have components such as a wired or wireless network interface, a keyboard, and an input/output interface for input and output. The image processing device may also include other components for realizing functions of the device, which will not be repeatedly described herein.

In the embodiment of the present disclosure, in the process of sequence identification on the target image, the first feature map of the target image is subjected to time sequence relationship extraction to obtain a second feature map that merges upper and lower information included in the target image. As such, the second feature map contains time sequence relationships between the respective characters. It is thus possible to carry out character identification in parallel based on the first feature map and the second feature map, to improve the character identification efficiency.

In an embodiment, there is also provided a computer-readable storage medium where at least one program code is stored. The at least one program code may be executed by a processor in an image processing device to complete the sequence identification methods in the above embodiments. For example, the computer-readable storage medium can be a ROM (Read-Only Memory), a RAM (Random Access Memory), a CD-ROM (Compact Disc Read-Only Memory), a magnetic tape, a floppy disk, and an optical data storage device, and so on.

In some examples, the at least one program code can be performed by the processor in the image processing device to perform the followings including:
  performing feature extraction on a to-be-identified target image through an image identification model to obtain a first feature map where the first feature map includes a plurality of first image features;
  performing time sequence relationship extraction on the first feature map based on a convolutional neural network layer and a fully connected layer in the image identification model, to obtain a second feature map that merges upper and lower information included in the to-be-identified target image, where the second feature map includes a plurality of second image features; and
  performing character identification on the to-be-identified target image in parallel based on the plurality of first image features and the plurality of second image features to obtain a character sequence.

In some examples, the at least one program code is loaded and executed by the processor to implement the followings including:
  determining a plurality of sets of image features based on the plurality of first image features and the plurality of second image features, where each of the plurality of sets of image features includes a first image feature and a second image feature at a same feature location;
  performing character identification on the plurality of sets of image features in parallel; and
  generating the character sequence based on a plurality of identified characters.

In some examples, the at least one program code is loaded and executed by the processor to implement the followings including:
  performing matrix operation on the first image features and the second image features in the plurality of sets of image features to obtain a third feature map, where the third feature map includes a plurality of third image features, a third image feature is obtained by performing matrix operation on the first image feature and the second image feature at the same feature location; and
  decoding the plurality of third image features in parallel to identify a character corresponding to each image feature.

In some examples, the first image feature is B×C1×H×W in size; the second image feature is B×T×H×W in size; the third image feature is B×C1×T in size;
  where B represents a batch parameter of the image identification model, C1 represents a number of feature channels of the image identification model; H represents a height of a feature map, W represents a width of the feature map, and T represents a predicted sequence length.

In some examples, the at least one program code is loaded and executed by the processor to implement the followings including:
  transforming a number of the channels of the first feature map through the convolutional neural network layer, to obtain a fourth feature map that merges the upper and lower information contained in the to-be-identified target image; and
  mapping channels in the fourth feature map to a preset sequence length through the fully connected layer to obtain the second feature map.

In some examples, the at least one program code is loaded and executed by the processor to further implement the followings including:
  acquiring a plurality of sample images, where each of the plurality of sample images labels a character sequence in the sample image; and
  training the image identification model through a convolutional neural network, based on the plurality of sample images and the character sequence labeled in each of the plurality of sample images.

In the present disclosure, there is also provided a computer program product including at least one computer program, which when executed by the processor, implements the sequence identification method provided by each of the above method embodiments.

In the embodiment of the present application, in the process of sequence identification on the target image, the first feature map of the target image is subjected to time sequence relationship extraction to obtain a second feature map that merges the upper and lower information included in the target image. As such, the second feature map contains time sequence relationships between the respective characters. It is thus possible to carry out character identification in parallel based on the first feature map and the second feature map, to improve the character identification efficiency.

Those of ordinary skill in the art can understand that all or part of the steps of implementing the above embodiments can be accomplished by hardware, or can be completed by instructing relevant hardware through a program, and the program can be stored in a computer-readable storage medium which may be a read-only memory, a magnetic disk or an optical disk, etc.

The above mentioned description is directed to only optional embodiments of the present disclosure, and is not

The invention claimed is:

1. A sequence identification method, comprising:
performing feature extraction on a to-be-identified target image through an image identification model to obtain a first feature map, wherein the first feature map comprises a plurality of first image features;
transforming a number of channels of the first feature map through a convolutional neural network layer in the image identification model to obtain a fourth feature map that merges upper and lower information comprised in the to-be-identified target image;
mapping channels in the fourth feature map to a preset sequence length through a fully connected layer in the image identification model to obtain a second feature map that merges the upper and lower information comprised in the to-be-identified target image, wherein the second feature map comprises a plurality of second image features, the preset sequence length is a maximum number of characters that the image identification model is capable of identifying, the upper and lower information comprised in the to-be-identified target image refers to a spatial position relationship of a sequence, and extraction of the spatial position relationship comprises a process of channel number change and a process of sequence length variation;
determining a plurality of sets of image features based on the plurality of first image features and the plurality of second image features, wherein each of the plurality of sets of image features comprises a first image feature and a second image feature at a same feature location;
performing matrix operation on the first image features and the second image features in the plurality of sets of image features to obtain a third feature map, wherein the third feature map comprises a plurality of third image features, a third image feature is obtained by performing matrix operation on the first image feature and the second image feature at the same feature location;
based on a decoding module in the image identification model, decoding the plurality of third image features in parallel by adopting a single-word classification prediction method to identify a character corresponding to each third image feature; and
generating a character sequence based on a plurality of identified characters.

2. The method according to claim 1, wherein the first image feature is B×C1×H×W in size; the second image feature is B×T×H×W in size; the third image feature is B×C1×T in size;
wherein B represents a batch parameter of the image identification model, C1 represents a number of feature channels of the image identification model; H represents a height of a feature map, W represents a width of the feature map, and T represents a predicted sequence length.

3. The method according to claim 1, further comprising:
acquiring a plurality of sample images, wherein each of the plurality of sample images labels a character sequence in the sample image; and
training the image identification model through a convolutional neural network, based on the plurality of sample images and the character sequence labeled in each of the plurality of sample images.

4. An image processing device, wherein the image processing device comprises a processor and a memory with at least one program code stored thereon, wherein the at least one program code is loaded and executed by the processor to implement followings comprising:
performing feature extraction on a to-be-identified target image through an image identification model to obtain a first feature map, wherein the first feature map comprises a plurality of first image features;
transforming a number of channels of the first feature map through a convolutional neural network layer in the image identification model to obtain a fourth feature map that merges upper and lower information comprised in the to-be-identified target image;
mapping channels in the fourth feature map to a preset sequence length through a fully connected layer in the image identification model to obtain a second feature map that merges upper and lower information comprised in the to-be-identified target image, wherein the second feature map comprises a plurality of second image features, the preset sequence length is a maximum number of characters that the image identification model is capable of identifying, the upper and lower information comprised in the to-be-identified target image refers to a spatial position relationship of a sequence, and extraction of the spatial position relationship comprises a process of channel number change and a process of sequence length variation;
determining a plurality of sets of image features based on the plurality of first image features and the plurality of second image features, wherein each of the plurality of sets of image features comprises a first image feature and a second image feature at a same feature location;
performing matrix operation on the first image features and the second image features in the plurality of sets of image features to obtain a third feature map, wherein the third feature map comprises a plurality of third image features, a third image feature is obtained by performing matrix operation on the first image feature and the second image feature at the same feature location;
based on a decoding module in the image identification model, decoding the plurality of third image features in parallel by adopting a single-word classification prediction method to identify a character corresponding to each third image feature; and
generating a character sequence based on a plurality of identified characters.

5. The image processing device according to claim 4,
wherein the first image feature is B×C1×H×W in size; the second image feature is B×T×H×W in size; the third image feature is B×C1×T in size;
wherein B represents a batch parameter of the image identification model, C1 represents a number of feature channels of the image identification model; H represents a height of a feature map, W represents a width of the feature map, and T represents a predicted sequence length.

6. The image processing device according to claim 4, wherein the at least one program code is loaded and executed by the processor to further implement followings comprising:
acquiring a plurality of sample images, wherein each of the plurality of sample images labels a character sequence in the sample image; and training the image identification model through a convolutional neural network, based the plurality of sample images and the character sequence labeled in each of the plurality of sample images.

7. A non-transitory computer-readable storage medium, wherein the computer-readable storage medium is stored with at least one program code which is loaded and executed by a processor to implement followings comprising:

performing feature extraction on a to-be-identified target image through an image identification model to obtain a first feature map, wherein the first feature map comprises a plurality of first image features;

transforming a number of channels of the first feature map through a convolutional neural network layer in the image identification model to obtain a fourth feature map that merges upper and lower information comprised in the to-be-identified target image;

mapping channels in the fourth feature map to a preset sequence length through a fully connected layer in the image identification model to obtain a second feature map that merges upper and lower information comprised in the to-be-identified target image, wherein the second feature map comprises a plurality of second image features, the preset sequence length is a maximum number of characters that the image identification model is capable of identifying, the upper and lower information comprised in the to-be-identified target image refers to a spatial position relationship of a sequence, and extraction of the spatial position relationship comprises a process of channel number change and a process of sequence length variation;

determining a plurality of sets of image features based on the plurality of first image features and the plurality of second image features, wherein each of the plurality of sets of image features comprises a first image feature and a second image feature at a same feature location;

performing matrix operation on the first image features and the second image features in the plurality of sets of image features to obtain a third feature map, wherein the third feature map comprises a plurality of third image features, a third image feature is obtained by performing matrix operation on the first image feature and the second image feature at the same feature location;

based on a decoding module in the image identification model, decoding the plurality of third image features in parallel by adopting a single-word classification prediction method to identify a character corresponding to each third image feature; and generating a character sequence based on a plurality of identified characters.

8. The storage medium according to claim 7, wherein the first image feature is B×C1×H×W in size; the second image feature is B×T×H×W in size; the third image feature is B×C1×T in size;

wherein B represents a batch parameter of the image identification model, C1 represents a number of feature channels of the image identification model; H represents a height of a feature map, W represents a width of the feature map, and T represents a predicted sequence length.

9. The storage medium according to claim 7, wherein the at least one program code is loaded and executed by the processor to further implement followings comprising:

acquiring a plurality of sample images, wherein each of the plurality of sample images labels a character sequence in the sample image; and training the image identification model through a convolutional neural network, based on the plurality of sample images and the character sequence labeled in each of the plurality of sample images.

* * * * *